United States Patent [19]

Trent et al.

[11] 4,346,050

[45] Aug. 24, 1982

[54] POLYMER CONCRETE HAVING LOW BINDER LEVELS

[75] Inventors: Peter F. Trent, Westmount; Raymond Charlebois, Laval Sur-le-Lac, both of Canada

[73] Assignee: Plastibeton Canada Inc., Montreal, Canada

[21] Appl. No.: 217,498

[22] Filed: Dec. 17, 1980

Related U.S. Application Data

[63] Continuation-in-part of Ser. No. 119,259, Feb. 7, 1980, abandoned, which is a continuation of Ser. No. 44,141, May 31, 1979, abandoned, which is a continuation of Ser. No. 918,196, Jun. 22, 1978, abandoned.

[51] Int. Cl.$^3$ .................................................. B28B 1/08
[52] U.S. Cl. ........................................ 264/71; 523/300; 523/521; 523/514; 523/515
[58] Field of Search ............... 260/40 R, 42.52, 42.43, 260/42.53; 264/71, 69

[56] References Cited

U.S. PATENT DOCUMENTS

| | | | |
|---|---|---|---|
| 3,070,557 | 12/1962 | Gessler et al. | 260/42.52 |
| 3,078,249 | 2/1963 | Russell | 260/40 R |
| 3,371,135 | 2/1968 | Goodwin | 264/71 |
| 3,442,851 | 5/1969 | McManimie | 260/42.52 |
| 3,450,808 | 6/1969 | Roberts | 264/71 |
| 3,763,083 | 10/1973 | Grotheer | 260/40 R |
| 3,795,725 | 3/1974 | Bulin | 264/71 |
| 3,801,536 | 4/1974 | Guenantin | 260/37 N |
| 3,825,639 | 7/1974 | Bulin | 264/72 |
| 3,856,054 | 12/1974 | Steinberg et al. | 264/71 |
| 4,267,402 | 5/1981 | Reighter | 264/71 |

FOREIGN PATENT DOCUMENTS 1912467 11/1969 Fed. Rep. of Germany.

OTHER PUBLICATIONS

Chemical Abstracts, vol. 90, 1979, Abstract 152994Y, vol. 73, 1970, Abstract 15664A.
Fontana et al., Rapid Patching of Deteriorated Concrete Using Polymer Concrete, 2nd International Congress on Polymers in Concrete, (11/78).
Kukacka et al., Polymer Concrete Patching Materials Users Manual, BNL 22361, Apr. 1977.
Kukacka et al., Concrete-Polymer Materials for Highway Applications, Final Report, BNL 50462, Jun. 1975.
Kukacka et al., The Use of Polymer-Concrete for Bridge Deck Repairs on the Major Deegan Expressway, BNL 19672, Jan. 1975.
Koblischek, Acryl-Concrete, 2nd International Congress on Polymers in Concrete, Nov. 1978.
Koblischek, Acrylic Concrete and its Application, 4th International Reaction-Resin Concrete Seminar, 1977.
Koblischek, Synthetic Resin-Bound Concrete, Proceedings of the First International Congress on Polymer Concretes, 1976.
Koblischek, Synthetic-Resin-Bonded Concrete, Betonstein-Zeitung, 1971.
Kukacka et al., Concrete-Polymer Materials for Highway Applications, BNL 50417, Dec. 1973.
DePuy et al., Concrete-Polymer Materials, BNL 50390, Dec. 1973.
DiKeou, Concrete-Polymer Materials-Third Topical Report, BNL 50275 (T-502), pp. 1–3, 12, 15–19, 105–107, Jan. 1971.
Kukacka et al., Concrete-Polymer Materials-Fourth Topical Report, BNL 50328, Jan. 1972.
Hornikel, Polyester Resin as a Binder for Concrete and Artificial Stone, "Kunststoffe im Bau", vol. 6, 1974.

*Primary Examiner*—Lewis T. Jacobs
*Attorney, Agent, or Firm*—Pollock, Vande Sande & Priddy

[57] ABSTRACT

Improved polymer bonded concrete is disclosed wherein the amount of polymer binder used may be reduced to amounts as low as 3 to 10% by weight of the concrete. The concrete has however high strength and other improved properties such as high modulus of elasticity, low thermal expansion and contraction, better fire resistance, low shrinkage on curing and the like and also very importantly, the cost is reduced. Preparation of the concrete is disclosed using an in situ polymerization process together with intense vibration of the monomer component-solids mix.

28 Claims, No Drawings

POLYMER CONCRETE HAVING LOW BINDER LEVELS

This application is a continuation-in-part application of application Ser. No. 119,259 filed Feb. 7, 1980 (now abandoned) which in turn is a continuation application of application Ser. No. 44,141 filed May 31, 1979 (now abandoned), in turn a continuation application of application Ser. No. 918,196 filed June 22, 1978 (now abandoned).

This invention relates to polymer concretes. More particularly it relates to polymer concretes having very low polymer binder levels.

Concretes manufactured with synthetic organic binders are known. These non-hydraulic concretes have superior properties once the binders are cured and fused with the inorganic components to produce a hardened mass. They are used in the production of precast elements for architectural or engineering applications or for cast-in-place uses, wherein strength, water and chemical resistance or speed of cure are desirable. The binder used is a catalyzed monomeric or resinous component and a variety of methods are known for mixing the binder with the inorganic material and achieving polymerization or curing.

Although polymer bonded concretes are now well-known, there are some major drawbacks to the use of many of them. These drawbacks are high cost, low modulus of elasticity, poor fire resistance, limited surface effects that can be achieved for architectural purposes, high shrinkage on curing resulting in curling or cracking, high exothermic reaction on curing leading to internal stresses and poor processibility in some cases due to the viscous nature of the liquid phase used. Such disadvantages are the result of the inability to reduce the organic binder component significantly below a level of about 10-15 percent by weight of the concrete particularly with respect to large structural items without causing other serious problems such as low compressive and tensile strengths, poor resistance to wear and sensitivity to impact. Low binder levels are however incidentally disclosed for some processes of making polymer concrete but other disadvantages are attendant thereon. For instance, some such processes have been used only in limited applications such as patching of roadways and the like. With others, the processes are complex or limited to special conditions which are not commercially attractive.

However, it has now been found that very low binder levels in high strength polymer bonded concrete can be achieved by a specific method which is simple and effective. The method has wide applicability as it can be applied to very large moldings of polymer concrete as for example, to produce a curved precast panel 5.33 meters (17½ feet) by 2.13 meters (7 feet) by 2.54 cm (1 inch) thick at a binder level of 6.7% by weight of composition. The method utilizes specific components and a very specific sequence of steps. Generally the method includes mixing certain monomeric materials with the inorganic components, together with polymerization initiator and allowing polymerization to occur as the setting process. The low viscosity of the liquid phase permits the mixing in of enough sand, fillers, and aggregates to obtain binder levels of 5-10% by weight and as low as 3%. Proper distribution of the binder material and resultant strength of the concrete product is achieved by intense vibration of the mixed components to obtain maximum packing of the solids and segregation of components either before or during the setting process. Setting is accelerated or initiated by the application of heat, and promotors and the like may be used.

In general terms there is presently provided a polymer concrete having high strength characteristics comprising an aggregate consisting of sand, stone or gravel or mixtures thereof and an organic binder in an amount of about 3 to about 10% by weight of the concrete, the organic binder consisting of polymer formed in situ from one or more $\alpha,\beta$-ethylenically unsaturated monomers of the group of styrene, styrene derivatives, $C_{1-8}$ alkyl esters of acrylic or methacrylic acids, and divinyl benzene, or a low viscosity solution of an unsaturated polyester in the monomers, the solution containing monomer in excess of that required for cross-linking the polyester.

The invention provides a process for the preparation of a polymer bonded concrete of less than 10% by weight binder content which comprises:

(1) mixing an aggregate consisting of sand, stone, or gravel or mixtures thereof with, as binder components,
   (a) one or more $\alpha,\beta$-ethylenically unsaturated monomers of the group of styrene, styrene derivatives, $C_{1-8}$ alkyl esters of acrylic or methacrylic acids, or divinyl benzene, or an unsaturated polyester dissolved in one or more of the monomers, the solution of monomer and polyester being of low viscosity and containing monomer in excess of that required for cross-linking purposes, and
   (b) a free radical polymerization initiator, to form a mixture of aggregate with binder components;
(2) casting the mixture;
(3) subjecting the mixture to intense vibration; and
(4) allowing the monomers to polymerize and set to produce the polymer bonded concrete.

In particular, the invention provides a process for the preparation of a polymer bonded concrete containing from 3 to less than 10% of organic binder material, which process comprises:

(1) mixing an aggregate consisting of sand, stone or gravel or mixtures thereof with binder components comprising
   (a) an unsaturated polyester resin dissolved in styrene monomer, the solution being of low viscosity and containing additional monomer in excess of that required for cross-linking of the polyester, the additional monomer being selected from the group styrene, methyl methacrylate and butylactylate, and
   (b) a free radical polymerization initiator, to form a mixture of the aggregate and the binder components;
(2) casting the mixture;
(3) subjecting the mixture to intense vibration; and
(4) causing the monomers to polymerize by the application of heat to produce the polymer bonded concrete;

and a process for the preparation of a polymer bonded concrete containing from 3 to less than 7% of organic binder material, which process comprises:

(1) mixing an aggregate consisting of sand, stone or gravel or mixtures thereof with binder components comprising
   (a) methyl methacrylate monomer, and (b) a free radical polymerization initiator, to form a mixture of the aggregate and the binder components;

(2) casting the mixture;

(3) subjecting the mixture to intense vibration; and (4) causing the monomers to polymerize by the application of heat to produce the polymer bonded concrete.

One would expect by the use of monomers and in situ polymerization that high shrinkage would occur as the monomers used inherently shrink far more during polymerization than occurs during curing of, for example, a polyester resin used alone as binder. For instance, the shrinkage that occurs in polymerization of methyl methacrylate to polymethyl methacrylate is 20–22%. In fact, however, when the present method is used, the retraction of the concrete is less than occurs in the preparation of conventional polymer bonded concretes prepared from resins and aggregates. Furthermore, the stress cracking that is normally associated with the exotherm produced by the curing of high-resin concretes is absent. The concrete also "places" better than hydraulic concrete, allowing casting in molds as thin as 1.27 cm (½ inch). Furthermore, standard concrete mixing and placing equipment may be used.

Because of the decreased levels of binder which may be used in the concrete according to the present invention, the total cost of the concrete often can be halved with no untoward effects on mechanical properties. For example, a formulation containing 3.5 percent unsaturated polyester dissolved in styrene (72:28) by weight, 3.1 percent methylmethacrylate, 0.08% initiator and 93% graded silica fillers, sand and aggregates has provided a concrete of 2750 p.s.i. in flexion, 13,500 p.s.i, in compression strength, having resistance to at least 2,500 cycles of freeze and thaw with little drop-off in properties, because it absorbs only 0.1% water. The modulus of elasticity, $6.6 \times 10^6$, is at least twice as high as that of conventional polyester bonded concretes. High modulus of elasticity is important particularly for large structural items such as flat panels as the higher the modulus of elasticity the greater the span that such panel can cover between supports. The weathering resistance is also improved in that a concrete such as aforementioned exhibited no change in appearance after 2500 hours in a weatherometer. Furthermore such polymer concrete has a linear thermal expansion and contraction comparable to that exhibited by conventional hydraulic concrete or steel e.g. $6.5 \times 10^{-6}$/°F. whereas conventional polymer concrete having high binder levels exhibits values of linear thermal expansion and contraction up to twice the aforementioned figure.

The binder is the only flammable component in polymer bonded concretes and as according to the present invention the proportion of the binder component is considerably reduced, the fire resistance is greatly improved. Furthermore, replacement of conventional fillers of smaller size with certain materials even further improves the fire resistant properties as will be detailed later herein.

The aggregates which can be used in the present process are sands, stone and gravel which are normally used for making concrete with hydraulic binders. The aggregates may be screened or crushed, preferably with not too many fines.

Fillers which are comminuted solids can be added to the actual aggregates as granulated material of particle size less than the aggregates. Silica is advantageously used because of its low price, low porosity and relatively great hardness. Examples of suitable types of silica are silica flour and Ottawa silica. Also among fillers which may be used are treated and untreated calcium carbonates. The percentage of the filler or extender which is used is determined for any given aggregate by a technique analagous to that used in the production of hydraulic cements and mortars. In consists for a given aggregate in testing various proportions of aggregates and extender in a system of the binder composition of interest. The quantity of the extender chosen will be that which corresponds substantially to the maximum of resistance to compression and of flexion. The fillers mentioned are not intended to be limiting as any fillers known in the art of concrete manufacture may be used.

Other materials may be added, as for example titanium dioxide or iron oxides or other materials for pigmentation.

It has been found that by replacement of smaller size fillers (e.g. 44–220 microns) with certain compounds, fire retardancy of the products is greatly increased over and above that achieved by reduction in the amount of binder used. These compounds may be any powdered substance which releases water of crystallization at high temperatures as for example alumina trihydrate, tricalcium aluminate hexahydrate and zinc borate. The amount of such materials which is required to provide maximum fire retardancy is in general about twice the amount of resin binder that is used. Thus in the conventional polymer concretes prohibitive amounts of these materials must be used, but with the concretes according to the present invention having low polymer binder content there is a corresponding decrease in the amount of fire retardant compound which is necessary to obtain maximum retardancy. Generally levels of 20–200% by weight based on binder greatly improves fire resistance of the concrete.

It has already been indicated in general that the monomers which may be used are $\alpha,\beta$-ethylenically unsaturated monomers, i.e. styrene and styrene derivatives, divinyl benzene and $C_{1-8}$ alkyl esters of acrylic and methacrylic acids. Examples of these monomers are styrene itself, lower alkyl substituted styrenes as for instance $\alpha$-methyl styrene and vinyl toluene, divinyl benzene, methyl acrylate, ethyl acrylate, isopropyl acrylate, butyl acrylate, 2-ethylhexyl acrylate, methyl methacrylate, ethyl methacrylate, isopropyl methacrylate, butyl methacrylate and the like. These monomers may be used alone or in combination and the preferred monomers, particularly from the point of view of cost, are styrene, methyl methacrylate and butyl acrylate. Suitably, others of the monomers may be combined with the preferred monomers to modify the properties of the binder and as such can be used in minor amounts.

Also other monomers in addition to those mentioned and cross-linking agents may be included in relatively low porportions to alter properties of the binder, as for instance to improve adhesion or increase glass transition temperature. Examples of these monomers and cross-linking agents are acrylic acid, methacrylic acid, 1,3-butylene dimethacrylate, trimethylolpropane trimethacrylate, diethyl phthalate, dibutyl phthalate and diallyl phthalate.

The foregoing monomers can be used as such or can be used to dissolve a certain proportion of unsaturated polyester. These unsaturated polyesters are condensation products of polyalcohols and unsaturated dibasic acids and are general purpose medium reactive resins conventionally used in the polymer concrete and fibre glass fields as binders. Examples are Palatal TM H-170 (obtainable from BASF Canada Ltd.) and Laminac TM 4193 (obtainable from Cyanamid of Canada) which are unsaturated polyester resins dissolved in styrene, there being incorporated in the resin about 1 part of maleic anhydride for every 2 parts of styrene. Paraplex TM P-444A (obtainable from Rohm and Haas Company Canada Ltd.) is a similar suitable unsaturated polyester.

It is known to add material such as styrene to unsaturated polyester resins and in fact they are supplied by chemical suppliers diluted with sufficient styrene for eventual cross-linking of the polyester. The proportions supplied are usually about 70 parts by weight polyester to 30 parts by weight styrene. The viscosity of such diluted resins is still far greater than 1000 cps. By the further dilution according to the present process with monomers as aforementioned viscosities of perhaps 50 cps down to less than 1 cps are obtained. Such diluted polyesters provide more monomer than is required for cross-linking of the polyester and when used according to the present invention polymerization of that monomer occurs as well as the cross-linking reaction. Obviously when an unsaturated polyester resin is not used, the viscosity of the monomer components is negligible when compared to the use of preformed resin binders and cross-linking is not involved.

For the purpose of the present process it has been found possible to use proportions of unsaturated polyester resin dissolved in monomers so long as the viscosity of the solution in the monomers does not exceed about 50 cps. In terms of proportion by weight, the polyester resin can constitute up to about 50% by weight of the binder components, and is preferably 40% by weight or less.

As indicated previously the amount of binder component which can be used according to the present process is generally between 5 and 10% by weight of the composition, but even lower proportions are suitably down to about 3%. The low viscosity of the liquid organic phase permits mixing in of high levels of aggregates, fillers and sand and other inorganic components and the low surface tension of the liquid phase allows intimate contact between the organic particles. Because of the low proportions of liquid used, it is not so much the liquid phase that provides the characteristics of curing and of the final product but rather a product is provided which is a nearly inorganic, nearly monolithic structure with particles of sand and aggregate intimately adhering to each other. The final product has in fact more of the characteristics of granite or stone than plastic, or for that matter even hydraulic concrete.

The amount of binder can be increased somewhat above 10% but if increased too much then problems arise in obtaining a good concrete and the improved properties obtainable with the lower binder levels are sacrificed.

The polymerization initiators which are added according to the present process are free radical type initiators which will effect polymerization of the monomers, and where applicable, cross-linking of the polyester resins used. These initiators may be either those which are active at room temperature or at increased temperatures. An example for use at room temperature is benzoyl peroxide together with nitrogen containing promoters such as N,N-diethyl-m-toluidine and N,N-dimethylaniline. An example of an initiator for use at elevated temperature is bis-4-tertiary-butyl-cyclohexyl peroxydicarbonate. The use of heat activated initiators and heat during setting of the concrete is of advantage in that it permits a longer pot-life of the fresh concrete mix. Other examples of appropriate initiators will immediately occur to those skilled in the art. The proportions of initiator will generally be 0.1 to 5% by weight of other binder components.

As indicated previously standard concrete mixing and placing equipment may be used for the concrete according to the present process. For precast concrete components, the molds used are preferably closed molds although open molds are possible. The reason for this is partly because of volatility of the monomers as heat is generally used to effect setting and also the use of closed molds prevents warping because heat can be applied from both sides and a more uniform polymerization obtained. If closed molds are used, it is not necessary that the mold be completely closed and by closed molds can be meant as well a mold with up to 10–30% of the concrete surface area being exposed.

It is standard practice in the manufacture of regular precast concrete to vibrate the concrete in order to place it and bring to the surface any air entrapped while mixing or pouring. The use of vibration in the process of the present invention is essential for those reasons and also for others, another being the achievement of minimum volume occupied by the aggregates or placement of the aggregates without voids. By reducing the viscosity of the liquid phase preferably to something of the order of less than 1 centipoise with concomitant reduction in surface tension the aggregates can settle freely on vibration and orient themselves in what inevitably turns out to be the most compact placement. This of course cannot be achieved with viscous binders. Since this procedure allows solids to impinge on solids, the shrinkage normally associated with increasing monomer level and conversion to polymer is not experienced. In the case of hydraulic concrete, over-vibration leads to segregation of the mix which is undesirable.

By contrast, over-vibration causing segregation is required for the present process and is what is meant by "intense vibration" as the term is used herein. It is determined empirically by vibration of the whole mold for precast articles, not just minor surface vibration, to the extent that in a closed vertical mold, for example, excess liquid or binder rises to the top to form a layer of approximately 0.64 cm to 5.1 cm (¼ inch to 2 inches) deep. In a horizontal open mold or in cast-in-place applications, the top surface area will be very much greater than in the closed vertical mold and the layer which accumulates on the top on intense vibration may be as low as for example 0.16 cm (1/16 inch) in depth. The accumulated layer from vertical closed mold casting can be cut off the edge of even very large panels if necessary or desirable. The top resin layer formed in open molding, which process is suitable for the manufacture of furniture or other such articles, can be arranged to be the underside or the back of the object and thus visually unimportant and need not be removed as such articles are not subject to great stress.

The intense vibration causing "segregation" as described also removes any significant amounts of voids in the mix, that is spaces or gaps between aggregate particles are reduced to a minimum.

Various vibrating devices can be used depending on the manner of manufacture of the concrete. For example with molds for precast concrete table vibrators can be used whereas for cast-in-place applications internal vibrating devices are appropriate. In fact any type of vibration may be used and any frequency, even mechanical shock, as long as it is intense enough to fulfill the degree of segregation of components or "settling" of aggregates as already described. Preferably, however, vibration of high amplitude and low frequency is employed to encourage segregation and the time over which vibration is carried out is generally lengthy compared to the time utilized in other concrete technology. An example of suitable conditions is a closed mold containing a 909 Kg. (2,000 pound) panel vibrated for 5 minutes by a 6 hp. vibrator operating at 1750 cycles per minute. A suitable range of frequencies is about 1700–3600 cycles per minute.

Once the concrete mixture has been cast and vibrated, the time required for setting will of course depend on the particular initiator used and whether or not heat is applied. The time required may be anything from 5 minutes up to 3 hours or longer and the temperature may be from room temperature up to 95° C. or higher.

Reinforcing materials used in conventional concrete mixes may also be used according to the present invention. These may be for example reinforcing bars or steel mesh. Also steel fibres may be used in the present compositions and can be merely mixed in with the other components, which is unlike hydraulic concretes wherein the steel fibres on mixing tend to agglomerate. Such reinforcment improves the tensile strength and impact resistance of the concrete.

The polymer bonded concretes according to the present invention can be modified as to surface appearance for various architectural uses. The surface of the concrete can be treated or etched with any solvent for the polymer binder used so that an exposed aggregate effect is obtained. A particularly useful solvent for polymethacrylate, polyacrylates or polystyrene is methylene chloride. Surface treatment of this type is normally produced in hydraulic concretes by etching with acids, retarding the surface cure of the concrete and/or by sand blasting.

A plastic-like finish on the concrete may be obtained in precast structures by applying a coating of pigmented resin in the mold prior to casting of the concrete. This surface coating adheres permanently to the concrete product. Examples of such resins are Palatal TM H-170 and Gel-Kote TM (available from Glidden Company).

The following examples are intended to be illustrative but not as limiting to the scope of the present invention.

In all the examples of the aggregates used were added to a conventional pan-type mixer, the liquid ingredients except for initiator then added, followed by the other dry ingredients and finally the initiator. Mixing was continued for two minutes and the mix then transferred to a closed 30 square foot mold. Vibration was carried out for two minutes using a 1½ horse power reciprocal vibrator operating at a frequency of 3450 rpm. The conditions of curing or setting are detailed in each example.

EXAMPLE 1

A polymer concrete according to the invention was prepared using the following components:

| | |
|---|---|
| Polyester Resin 72% Styrene 28% (Palatal* H-170) | 3.5% |
| Methyl Methacrylate | 3.1% |
| Bis-4-Tertbutylcyclohexyl Peroxydicarbonate | 0.08% |
| Silica Flour (>200 Mesh) | 12.6% |
| Ottawa Silica (27 Mesh) | 21.2% |
| Round Quartz Aggregates (⅛"-¾") | 58.8% |
| Titanium Dioxide | 0.8% |
| % Organic: | 6.7 |
| Heat Cure: | (¾ hour at 175° F. = 79° C.) |
| Thickness of Casting: | ≧¾" |
| Compressive Strength: | 13,500 p.s.i. (ASTM C39-73) |
| Flexural Strength: | 2,750 p.s.i. (ASTM C78-75) |
| Modulus of Elasticity: | 6.6 × 10⁶ p.s.i. (ASTM C469-65) |

EXAMPLE 2

The following components were used in preparation of a polymer concrete according to the invention:

| | |
|---|---|
| Methyl Methacrylate | 5.7% |
| Bis-4-Tertbutylcyclohexyl Peroxydicarbonate | 0.05% |
| Titanium Dioxide | 0.25% |
| Calcium Carbonate 250 Mesh + | 12.00% |
| Calcium Carbonate 50–500 mesh | 14.00% |
| Aggregates ⅛"-1" | 67.20% |
| % Organic: | 5.8% |
| Heat Cure: | (1 hour at 160° F. = 71° C.) |
| Thickness of Casting: | ≧2" |

EXAMPLE 3

The following components were used:

| | |
|---|---|
| Polyester resin 72%, Styrene 28% (Palatal TM H-170) | 3.20% |
| Butyl Acrylate | 1.60% |
| Methyl Methacrylate | 1.60% |
| Silica Flour* (200 Mesh) | 12.00% |
| Ottawa Silica (27 Mesh) | 32.00% |
| Round Quartz Aggregates (⅛"-¾") | 49.00% |
| Titanium Dioxide | 0.13% |
| N-N-Diethyl-m-Toluidine | 0.04% |
| N,N-Dimethylaniline | 0.08% |
| Benzoyl Peroxide 70% (Granules) | 0.25% |
| % Organic: | 6.77 |
| Room Temperature Cure: | (3 hours at 70° F. = 21° C.) |
| Thickness of Casting: | ≧2" |

*7.8% retained on 200 mesh; 12.9% retained on 270 mesh; 11.1% retained on 325 mesh, pan: 66.7%.

EXAMPLE 4

This concrete was prepared from the following:

| | |
|---|---|
| Polyester Resin 72%, Styrene 28% (Palatal TM H-170) | 2.5% |
| Methyl Methacrylate | 2.5% |
| Bis-4-Tertbutylcyclohexyl Peroxydicarbonate | 0.1% |
| Silica Flour (>200 Mesh) | 12.9% |
| Ottawa Flour (27 Mesh) | 21.9% |
| Round Quartz Aggregates (⅛"-¾") | 59.7% |
| Titanium Dioxide | 0.4% |
| % Organic: | 5.1 |
| Heat Cure: | (¾ hour at 175° F. = 79° C.) |
| Thickness of Casting: | ≧2" |

This example was also repeated using only styrene in place of methyl methacrylate with comparable results.

EXAMPLE 5

The following were used to prepare a concrete mix:

| | |
|---|---|
| Polyester resin 72%, Styrene 28% (Palatal* H-170) | 3.3% |
| Methyl Methacrylate | 2.7% |
| Bis-4-Tertbutylcyclohexyl Peroxydicarbonate | 0.6% |
| Silica Flour (>200 Mesh) | 10.0% |

-continued

| | |
|---|---|
| Ottawa Silica (27 Mesh) | 15.0% |
| Round Quartz Aggregates (⅛"-⅜") | 68.5% |
| Iron Oxide Color | 0.5% |
| % Organic: | 6.1 |
| Heat Cure: | (15 Minutes at 200° F. = 93° C.) |
| Thickness of Casting: | ≧1" |

EXAMPLE 6

The following ingredients were mixed and cured:

| | |
|---|---|
| Polyester resin 72%, Styrene 28% (Palatal TM H-170) | 2.9% |
| Methyl Methacrylate | 2.9% |
| Bis-4-Tertbutylcyclohexyl Peroxydicarbonate | 0.06% |
| Silica Flour (>200 Mesh) | 3.8% |
| Aluminum Hydrate (Average 100 Mesh) | 10.0% |
| Ottawa Silica (27 Mesh) | 16.2% |
| Round Quartz Aggregates (⅛"-⅜") | 64.0% |
| Titanium Dioxide | 0.2% |
| % Organic: | 5.9 |
| Heat Cure: | (1 hour at 165° F. = 73.9° C.) |
| Thickness of Casting: | 2" |

EXAMPLE 7

A concrete was prepared from the following:

| | |
|---|---|
| Polyester Resin 72%, Styrene 28% (Palatal TM H-170) | 3.3% |
| Methyl Methacrylate | 3.3% |
| Bis-4-Tertbutylcyclohexyl Peroxydicarbonate | 0.1% |
| Silica Flour (>200 Mesh) | 6.0% |
| Aluminum Hydrate (Average 100 Mesh) | 13.4% |
| Ottawa Silica (27 Mesh) | 15.2% |
| Round Quartz Aggregates (⅛"-⅜") | 57.46% |
| Titanium Dioxide | 0.14% |
| Molybdate Orange | 1.12% |
| % Organic: | 6.7 |
| Heat Cure: | (½ hour at 175° F. = 79.4° C.) |
| Thickness of Casting: | ≦2" |

The polymer concretes of Examples 2-7 had properties very similar to those of the concrete of Example 1, for instance compressive strengths of the order of 13,500 p.s.i.

It was found that the properties of the concretes of the foregoing Examples did not vary to any significant degree for the binder proportions specified.

As an indication of the fire resistant properties of polymer concretes as illustrated in Examples 6 and 7, a concrete made from the components as listed in Example 7 but without the molybdate orange coloring was found not to give off smoke or flame during decomposition by a 2500° F. (1427° C.) heat source. Smoke emission according to ASTM D2843 was 1% while a test for fire resistance (ASTM D2863) resulted in an oxygen index of over 80.

All of the foregoing examples of polymer bonded concretes according to the invention may be used for precast panels for fascia panels for buildings having thicknesses of ⅜ to 4" (0.95 cm to 10.16 cm), patio slabs, concrete flower boxes, garden furniture, load bearing or non-load bearing sandwich panels using urethane foam sandwich between two slabs of polymer concrete adhered both mechanically and chemically, wall cladding ⅜ to 1 inch (0.95-2.54 cm) thick to replace conventional lath and stucco systems, plywood and aluminum and steel siding, and the like.

The polymer bonded concretes of examples, 1, 3, 4 and 5 are particularly suitable for the manufacture of drain, sewer and other pipes because of chemical and abrasion resistance. These polymer concretes are also of use for chemically resistant articles such as pump motor boxes, storage tanks and basis, floor slabs and tiles.

The polymer concrete of Example 1 has been used in the form of panels to protect the sides, undersides, or supporting pillars of elevated highways because of its extremely high chemical resistance. This concrete has also been used as permanent, white, impervious forms for highway median strips, these forms being thin shells utilizing regular hydraulic concrete as filler.

The polymer concrete of Example 4 is abrasion resistant and is particularly suitable for the manufacture of railroad ties and tracks for rubber tired subway cars.

The polymer concretes of Examples 6 and 7 are particularly suitable for the manufacture of fire resistant panels and the like because of the low binder content and inclusion of aluminum hydrate.

The embodiments of the invention in which an exclusive property or privilege is claimed are defined as follows:

1. A process for preparation of a polymer bonded concrete of less than 10% by weight organic binder which comprises
   (1) mixing an aggregate containing sand, stone or gravel or mixtures thereof with, as binder components,
      (a) at least one material selected from the group of α, β-ethylenically unsaturated monomer and an unsaturated polyester dissolved in at least one of said α, β-ethylenically unsaturated monomer, the solution of monomer and polyester being of low viscosity and containing monomer in excess of that required for crosslinking purposes, and wherein said α,β-ethylenically unsaturated monomer is selected from the group of styrene, styrene derivatives, $C_{1-18}$ alkyl esters of acrylic acid, $C_{1-8}$ alkyl esters of methacrylic acid, divinyl benzene, and mixtures thereof; and
      (b) a free radical polymerication initiator, to form a mixture of aggregate with binder components;
   (2) casting the mixture;
   (3) subjecting the mixture to intense vibration, wherein the vibration is sufficiently intense to cause segregation of aggregate from binder and to cause a layer of excess liquid binder to form on the upper surface of the cast mixture, and
   (4) allowing the monomers to polymerize and set to produce the polymer bonded concrete.

2. A process for the preparation of a polymer bonded concrete containing from 3 to less than 10% of organic binder which comprises
   (1) mixing an aggregate containing sand, stone or gravel or mixture thereof with binder components comprising
      (a) an unsaturated polyester resin dissolved in styrene monomer, the solution being of low viscosity and containing additional monomer in excess of that required for crosslinking of the polyester, said additional monomer being selected from the group of styrene, methyl methacrylate, butylacrylate, and mixtures thereof, and
      (b) a free radical polymerization initiator, to form a mixture of said aggregate and said binder components;
   (2) casting said mixture;
   (3) subjecting said mixture to intense vibration wherein the vibration is sufficiently intense to cause segregation of aggregate from binder and to cause a layer of excess liquid binder to form on the upper surface of the cast mixture, and (4) causing said monomers to polymerize by the application of heat to produce said polymer bonded concrete.

3. The process of claim 2 wherein heating is applied in the range of temperature up to 200° F.

4. The process of claim 2 wherein fillers are also mixed with said aggregate and binder components.

5. The process of claim 4 wherein said filler is selected from the group of silica, calcium carbonate, titanium dioxide and iron oxides.

6. The process of claim 2, 3 or 4 wherein the initiator is bis-4-tert-butylcyclohexyl peroxydicarbonate.

7. The process of claim 2 wherein a fire-retardant material is incorporated in an amount of 20-200% based on binder.

8. The process of claim 7 wherein the fire-retardant material is selected from the group of alumina trihydrate and zinc borate.

9. The process of claim 1 or 2, wherein a solution of polyester in monomer is used having a polyester content of not greater than 50% by weight of binder.

10. The process of claim 1 or 2, wherein a solution of polyester in monomer is used having a polyester content of 40% by weight or less based on binder.

11. The process of claim 1 or 2 wherein binder component (a) comprises about 5 to less than 10% of the total composition.

12. The process of claim 1 or 2 wherein the initiator is used in an amount of about 0.1 to 5% by weight of other binder components.

13. The process of claim 1 or 2 wherein the mixture is cast in a closed mold which covers 70% or more of the surface of the mixture.

14. The process of claim 1 or 2 wherein the viscosity of the binder is less than 50 centipoise.

15. The process of claim 1 or 2 wherein the viscosity of the binder is less than 1 centipoise.

16. The process of claim 1 or 2 wherein the intense vibration is of high amplitude and low frequency.

17. The process of claim 16 wherein said frequency is about 1700 to about 3600 cycles per minute.

18. A process for the preparation of a polymer bonded concrete containing from 3 to less than 7% of organic binder material, which process comprises (1) mixing an aggregate containing sand, stone or gravel or mixtures thereof with binder component comprising
   (a) methyl methacrylate monomer, and
   (b) a free radical polymerization initiator, to form a mixture of said aggregate and said binder components;

(2) casting said mixture;

(3) subjecting said mixture to intense vibration, wherein the vibration is sufficiently intense to cause segregation of aggregate from binder and to cause a layer of excess liquid binder to form on the upper surface of the cast mixture, and (4) causing said monomer to polymerize by the application of heat to produce said polymer bonded concrete.

19. The process of claim 18 wherein the binder component comprises about 5 to less than 7% of the total composition.

20. The process of claim 19 or 18 wherein the vibration is of high amplitude and low frequency.

21. The process of claim 20 wherein said frequency is about 1700 to about 3600 cycles per minute.

22. The process of claim 1, 2 or 18 which comprises casting said mixture into a closed vertical mold and wherein said layer is about 0.64 to about 5.1 cm deep.

23. The process of claim 22 wherein the thickness of said polymer bonded concrete is ⅜" to 4".

24. The process of claim 1, 2 or 18 which comprises casting said mixture into a horizontal open mold and wherein said layer is at least 0.16 cm deep.

25. The process of claim 24 wherein the thickness of said polymer bonded concrete is ⅜" to 4".

26. The process of claim 1, 2 or 18 wherein the thickness of said polymer bonded concrete is ⅜ to 4".

27. The process of claim 1, 2 or 18 wherein the thickness of said polymer bonded concrete is ⅜" to 1".

28. The process of claim 1, 2 or 18 wherein said aggregate contains quartz of ⅛" to ¾".

* * * * *